United States Patent Office 3,221,142
Patented Nov. 30, 1965

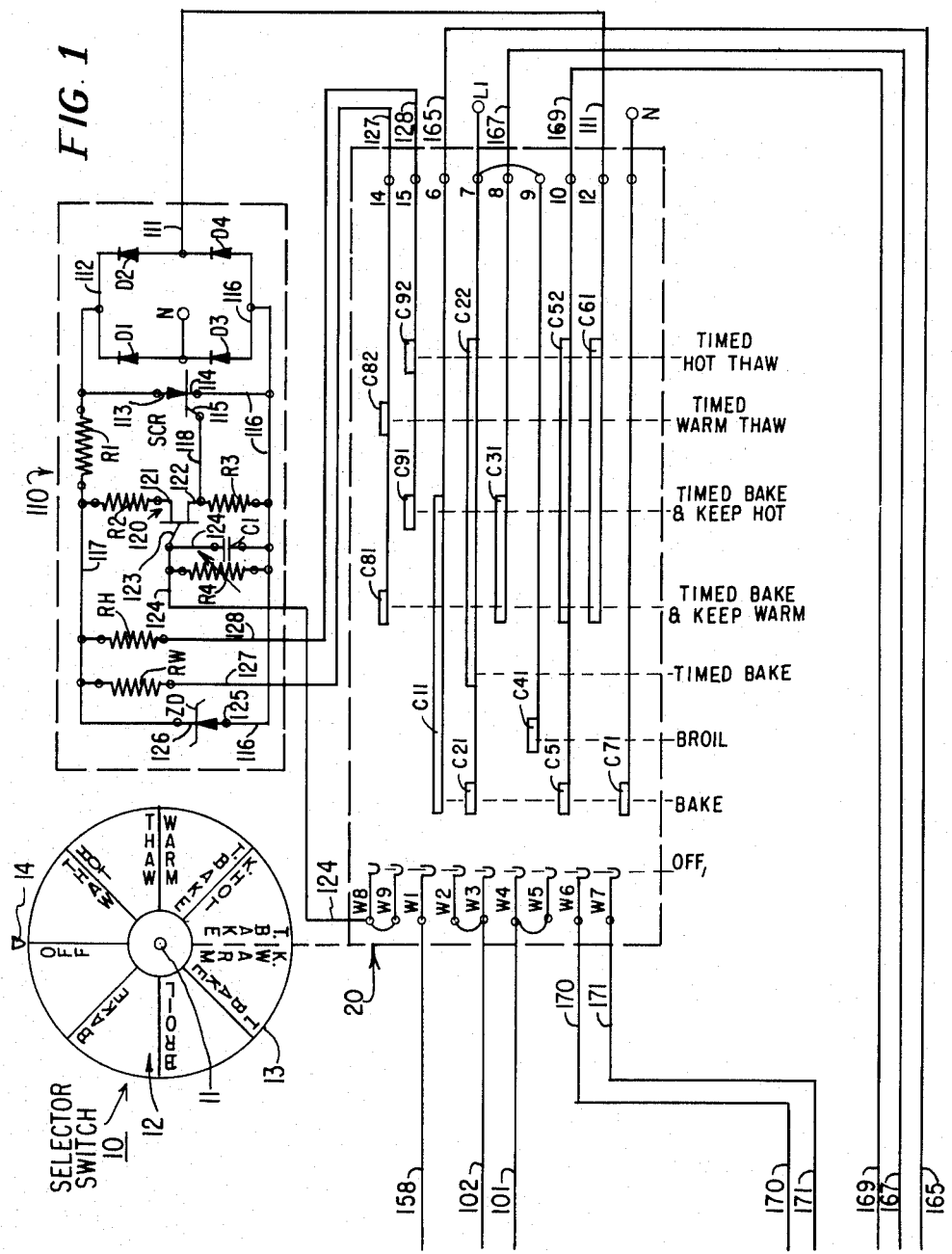

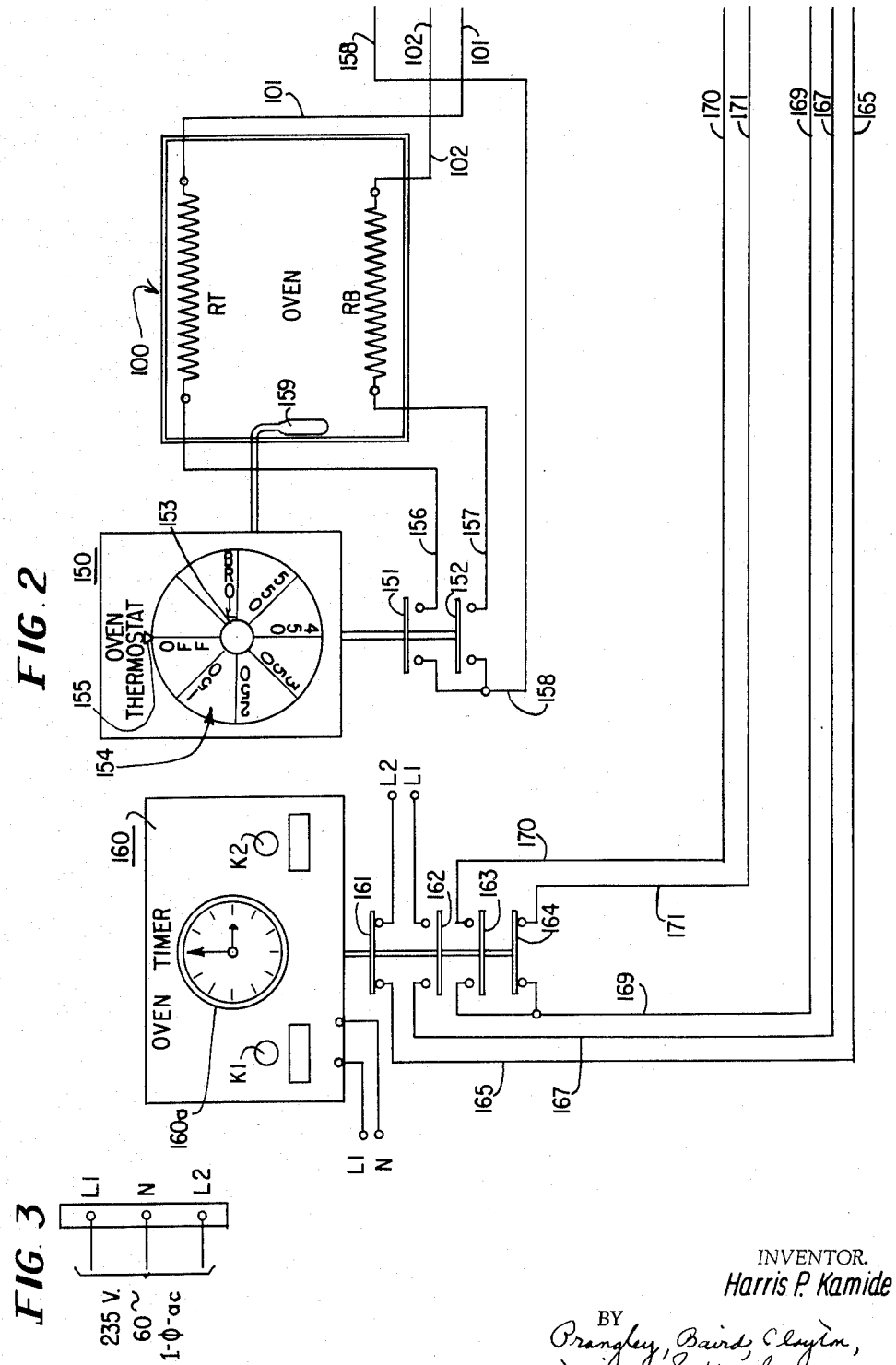

3,221,142
HOUSEHOLD COOKING OVENS INCORPORATING WARMING AND THAWING SYSTEMS
Harris P. Kamide, Franklin Park, Ill., assignor to General Electric Company, a corporation of New York
Filed Sept. 19, 1963, Ser. No. 310,088
6 Claims. (Cl. 219—413)

The present invention relates to household cooking ovens, and particularly to such ovens including systems for warming and systems for thawing food disposed therein.

It is a general object of the present invention to provide an improved household cooking oven of the type having a selector switch and an oven thermostat and an oven timer and circuits associated therewith all cooperating to provide the usual "bake" operation and "broil" operation and "timed bake" operation, wherein a system is provided that is operable at the end of the "timed bake" operation for holding the food baked in the oven at a predetermined warming or holding temperature.

Another object of the invention is to provide an improved household cooking oven of the type set forth having controls and circuits for a "timed bake" operation, wherein a system is provided that is operative at the end of a "timed bake" operation for holding the food within the oven at one of two selected holding or warming temperatures, the desired warming temperature being manually selectable by means of the oven selector switch.

Another object of the invention is to provide an improved household cooking oven of the type set forth having controls and circuits for a "timed bake" operation, wherein a system is provided for supplying a thawing heat to the oven for thawing foods disposed within the oven.

In connection with the foregoing object, it is another object of the invention to provide in an improved household cooking oven of the type set forth provided with controls and circuits for carrying out a "timed bake" operation, a system for supplying a thawing heat to the oven including a manually operable controller for preselecting the time duration of the thawing operation.

A further object of the invention is to provide an improved household cooking oven of the type set forth having controls and circuits carrying out a "timed bake" operation, wherein a system is provided for supplying thawing heat to the oven at two different thawing temperatures for thawing foods disposed within the oven at the two thawing temperatures mentioned, the selector switch for the oven permitting manual selection of the desired thawing temperature for carrying out the thawing operation of the beginning of a "timed bake" operation.

A still further object of the invention is to provide an improved household cooking oven of the type set forth having controls and circuits for carrying out a "timed bake" operation, wherein both a warming system and a thawing system are incorporated therein, the warming system supplying a warming temperature for the food disposed within the oven at the end of a "timed bake" operation to hold the temperature of the food at a predetermined level, the thawing system supplying a thawing heat to the oven at the beginning of a "timed bake" operation for thawing foods disposed within the oven at a predetermined temperature.

Further features of the invention pertain to the particular arrangement of the elements of the oven and the controls therefor, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a diagrammatic view of the selector switch and the control circuit forming a part of a household cooking oven embodying the present invention;

FIG. 2 is a diagrammatic view of an oven and an oven thermostat therefor and an oven timer for the oven embodying the present invention, FIGS. 1 and 2 together illustrating the full schematic electrical circuit for the oven of the present invention; and FIG. 3 is a diagrammatic illustration of a typical source of electric power for operating the oven system of FIGS. 1 and 2.

Referring now to FIGS. 1–3, inclusive, of the drawings, there is illustrated in schematic fashion an oven 100 embodying the features of the present invention. More particularly, the oven 100 comprises an upstanding substantially box-like metal body or liner defining an oven cooking cavity therein, the liner typically comprising a rear wall, a top wall, a bottom wall and a pair of side walls. The interior surfaces of the oven 100 may be finished in any conventional manner, such for example, as by carrying a layer of porcelain enamel of the glass-frit type, not shown. In the installation, the front opening in the oven 100 is provided with an associated oven door which closes the oven 100 and forms the sixth wall therefor.

An upper or broil electric heating unit RT is arranged in the upper portion of the oven 100 adjacent to the top wall thereof; and a lower or bake electric heating unit RB is arranged in the lower portion of the oven 100 adjacent to the bottom wall thereof. Also, the broil heating unit RT may be provided with the usual heat reflector (not shown) positioned thereabove and below the top wall of the oven 100, and the side walls may carry the usual tiers of horizontally aligned shelf supporting bosses (not shown), which bosses may support one or more movable shelves, not shown, in the oven 100, in the usual manner.

Further, the oven 100 is provided with an electric control network as is schematically illustrated in FIGS. 1 and 2, the control network being powered from a suitable source of electric power illustrated in FIG. 3, the source of FIG. 3 comprising a 3-wire Edison source of power supply of 236 volts, single phase, 60 cycles, A.-C. provided with a pair of outside line conductors L1 and L2 and a grounded neutral conductor N. Also, the control network includes a manually operable selector switch 10, an electrical control circuit 110, a manually settable oven thermostat 150, and a clock-controlled timer 160.

As illustrated in FIG. 1, the selector switch 10 comprises a rotatable operating shaft 11 carrying a manually operable dial 12 on the outer end thereof and a switching drum 20 on the inner end thereof. The dial 12 comprises a skirt carrying indicia that correspond to the control positions of the selector switch 10 and that cooperate with an associated index marker 14. Specifically, the skirt of the dial 12 carries the indicia "off," "brake," "broil," "timed bake," "timed bake and keep warm," "timed bake and keep hot," "warm thaw" and "hot thaw" disposed angularly thereabout. The switching drum 20 carries contact structure C11, C21 and C22, C31, C41, C51 and C52, C61, C71, C81 and C82, and C91 and C92 disposed angularly thereabout and respectively cooperating with stationary switch springs W1 to W9 inclusive, in the usual drum-controller array.

The oven thermostat switch 150 comprises a rotatable operating shaft 153 carrying a manually operable dial 150 on the outer end thereof and control structure, not shown, on the inner end thereof, the control structure being operable in conjunction with a temperature responsive tube 159 disposed in the oven 100 to control the opening and closing the pair of switch contacts 151 and 152 so as to maintain the temperature within the oven 100 at the value set by the position of the dial 154, all as is well known in the art. The dial 154 further comprises a skirt carrying indicia that correspond to the control positions mentioned and that cooperate with an associated index marker 155, the skirt of the dial 154 carrying the indicia "off," "150," etc., "550" and "broil." The indicia "150," etc., refer to ° F.; whereby the normal cooking temperature range of the oven thermostat 150 embraces the range 150° F. to 550° F. As has been explained above, the temperature sensing bulb 159 is operatively associated with the oven 100 and subject to the temperature therein in the usual manner so as in cooperation with structure not shown to close the switch contacts 151 and 152 when the temperature within the oven 100 is below that set by the manual dial 154 and being operable to open the switch contacts 151 and 152 when the temperature within the oven 100 is above that set by the manual dial 154.

The oven timer 160 includes a clock proper 160a of the synchronous motor type, preferably a "Telechron," a "time-to-stop" manually settable knob K1 and a "cooking time" manually settable knob K2 of the usual form including a "manual" position and a plurality of "cooking time" positions. The oven timer 160 further includes the usual switch contacts 161 and 164 and in accordance with the present invention further comprises a pair of back contacts 162 and 163, the contacts 161 and 164 being normally closed and the switch contacts 162 and 163 being normally open. When the timer is set by moving the knob K1 to a selected time and by moving the knob K2 out of its "manual" position, the switch contacts 161 and 164 are opened and the switch contacts 162 and 163 are closed. The contacts remain in this position until a clock time set by the knob K2 and preceding the clock time-to-stop set by the knob K1, at which time the main contacts 161 and 164 are closed and the back contacts 161 and 163 are opened; the contacts remain in this position until the clock time-to-stop set by the knob K1 at which time the main contacts 161 and 164 are reopened and the back contacts 162 and 163 are reclosed; the contacts remain in this position until the knob K2 is returned to its "manual" position.

In the circuit network, the contact C11 terminates a conductor 165 which is also connected to the switch contacts 161 of the oven timer 160; the contacts C21 and C22 and C41 terminate the line conductor L1; the contact C31 terminates the conductor 167, which also connects to the switch contact 162 of the oven timer 160; the contacts C51 and C52 terminate the conductor 169; the contact C61 terminates the conductor 111 connected to the control circuit 110; the contact C71 terminates the neutral conductor N; the contacts C81 and C82 and the contacts C91 and C92 respectively terminate two conductors 127 and 128 which are connected to the control circuit 110.

The switch spring W1 is connected by the conductor 158 to one of the terminals of both the switch contacts 151 and 152 on the oven thermostat 150; the switch springs W2 and W3 commonly terminate a conductor 102 which is also connected to one terminal of the bake heating unit RB; the switch springs W4 and W5 commonly terminate a conductor 101 which is also connected to one terminal of the broil heating unit RT in the oven 100; the switch springs W6 and W7 respectively terminate conductors 170 and 171 which are respectively connected to one of the terminals of the switch contacts 163 and 164, respectively; the switch springs W8 and W9 commonly terminate a conductor 124 which is connected to the electronic control circuit 110. The other terminal of the bake heating unit RB is connected by a conductor 157 to the other terminal of the switch contacts 152 and the other terminal of the broil baking unit RT is connected by a conductor 156 to the other terminal of the switch contact 151. The other terminals of the switch contacts 161 and 162 are connected respectively to the line conductors L2 and L1. The oven timer 160 is further provided with suitable power to operate the motors therein from the line conductor L1 and the neutral conductor N.

Referring to FIG. 1, the electronic control circuit or apparatus 110 includes a rectifying network comprising the diodes D1, D2, D3 and D4 arranged in the usual rectifying net and having one of the input terminals thereof connected to the high potential conductor 111 and having the other input terminal thereof connected to the neutral conductor N. The output from the rectifying network appears on conductors 112 and 116 which is applied directly to a silicon controlled rectifier SCR, the rectifier SCR being more particularly a solid state rectifier comprising four rectifying junctions in series, namely, p-n-p-n, and having power terminals 113 and 114 connected to the terminal p- and n-junctions and having a control terminal 115 connected to the intermediate p-junction. The rectifier SCR is characterized by having a high impedance to the flow of current between the terminals 113 and 114 in both directions when no signal is applied to the control terminal 115 and by having a low impedance between the terminals 113 and 114 when a predetermined pulse is applied to the control terminal 115. More specifically, one of the output conductors 112 in the rectifying network is connected to the power terminal 113 and the other power terminal 114 is connected to the conductor 116.

In order to provide a control signal for application to the control terminal 115 and the rectifier SCR, further circuit elements are provided in the electronic control circuit 110 including the resistor R1 having one terminal thereof connected to the conductor 112, the other terminals being connected to a conductor 117. The fullwave rectified output between the conductors 116 and 117 is applied across a Zener diode ZD having power terminals 125 and 126 connected respectively to the D.-C. conductors 116 and 117. The diode ZD is characterized by a high impedance to current flow between the power terminals 125 and 126 thereof until a predetermined potential is applied thereacross, after which the diode ZD conducts to maintain the potential at the predetermined value, the diode ZD therefore clipping the fullwave rectified D.-C. potential between the conductors 116 and 117. The clipped D.-C. potential between the conductors 116 and 117 is used as an input to a charging network for the capacitor C1, the capacitor C1 charging through either the resistor RW or the resistor RH depending upon the setting of the selector switch 10. More particularly, the capacitor C1 has one terminal thereof connected to the conductor 116 and the other terminal thereof connected to the terminal 124 which has the other end thereof terminated by the switch springs W8 and W9 as described above. One terminal of the resistor RW is connected to the conductor 117 and the other terminal thereof is connected to the terminal 128; while the resistor RH has one terminal thereof connected to the conductor 117 and the other terminal thereof connected to the conductor 127. There further is provided in parallel with the charging capacitor C1 a variable resistor R4.

The operating potential on the conductor 124 is applied as the input to an unijunction transistor 120 having a pair of power terminals 121 and 122 and a control terminal 123. The power terminal 121 is connected to one terminal of a resistor R2 which has the other terminal thereof connected to the conductor 117; while the power terminal 122 is connected to one terminal of a resistor R3 having the other terminal thereof connected to the conductor 116. The power terminal 122 is further connected by a conductor 118 to the control terminal 115 of the rectifier SCR. The unijunction transistor 120 is characterized by a high impedance between the power terminals 121 and 122 thereof when there is no potential applied between the control terminal 123 and one of the power terminals 121 or 122; but upon the application of a suitable potential between the control terminal 123 the power terminal 122, for example, such as from the charging of the capacitor C1, the unijunction transistor 120 becomes highly conductive so as to generate across the resistor R3 a sharp pulse which is applied as the input control terminal 115 of the rectifier SCR. The rectifier SCR is in a series connection between the conductor 111 and the neutral conductor N, and more particularly a circuit can be traced from the circuit 111 through the diode D2, the conductor 112, the rectifier SCR, the conductor 116 and the diode D3 to the conductor N. As will be explained more fully hereinafter, the heating units for use in the "keep warm," "keep hot," "thaw warm," and "thaw hot" purposes are all in series with the conductor 111 to a high potential line conductor so that the rectifier SCR controls the current flow therethrough.

Considering now the general mode of operation of the circuit network, when the selector switch 10 occupies its "off" position, all of the circuits are open. When the selector switch 10 occupies any one of its positions other than its "off" position, one or more of the various circuits described above is energized. Specifically, when the cook sets the dial 12 of the selector switch 10 into its "bake" position, she also sets the dial 154 of the oven thermostat 150 into a temperature setting corresponding to that at which the baking operation is to be carried out. If the temperature within the oven 100 as sensed by the bulb 159 therein is below that set by the dial 154, a circuit is completed from the line conductor L1 through the bake heating unit RB to the line conductor L2, and a circuit is completed from the neutral conductor N through the broil heating unit RT to the line conductor L2. More specifically and referring to FIGS. 1 and 2, a circuit is completed from the line conductor L1 through the contact C21, the switch contact W2 and the conductor 102 to one terminal of the bake heating unit RB; from the other terminal of the heating unit RB through the conductor 157, the closed switch contacts 152 (which are closed because the temperature sensed within the oven 100 is less than that set by the dial 154), the conductor 158, the switch spring W1, the contact C11, and the conductor 165 to the closed contact 161 to the line conductor L2; whereby to apply the full operating potential between the line conductors L1 and L2 to the terminals of the bake heating unit RB. A second circuit is established from the neutral conductor N through the contact C71, the switch spring W7, the conductor 171, the closed switch contacts 164, the conductor 169, the contact C51, the switch spring W5 and the conductor 102 to one terminal of the broil heating unit RT; from the other terminal of the broil heating unit RT through the conductor 156, the closed switch contacts 151, the conductor 158, the switch spring W1, the contact C11, the conductor 165, and the normally closed switch contacts 161 to the line conductor L2; whereby to apply the potential between the line conductor L2 and the neutral conductor N to the terminals of the broil heating unit RT. As the temperature within the oven 100 rises to that set by the dial 154, the oven thermostat 150 is operated to move the contacts 151 and 152 from the normally closed positions thereof to the open positions thereof, thereby to remove the operating potentials from the heating units RB and RT. Subsequently, when the temperature within the oven 100 falls below that set by the manual dial 154, the oven thermostat 150 will operate to close the contacts 151 and 152 thus again to apply the operating potentials to the heating units RB and RT, all in a conventional manner.

Should the cook set the manual dial 12 to the "broil" position and set the oven thermostat 150 and more particularly the dial 154 thereof to the "broil" position, a circuit is completed for the broil heating unit RT only.

More specifically, a circuit is completed from the line conductor L1 through the contact C41, the switch spring W4, the conductor 101 to one terminal of the broil heating unit RT; from the other terminal of the broil heating unit RT through the conductor 156, the normally closed contacts 151, the conductor 158, the switch spring W1, the contact C11, the conductor 165 and the normally closed contacts 161 to the line conductor L2; whereby to apply the full potential between the line conductors L1 and L2 across the broil heating unit RT. With the oven thermostat 150 set in the "broil" position thereof, the switch contacts 151 will remain closed at all temperatures, within the oven 100 below about 600° F. during the broil operation.

In order to carry out a "timed bake" operation in the oven 100, the cook sets the "time-to-stop" knob K1 and the "time-to-start" knob K2 on the oven timer 160, sets the dial 12 of the selector switch 10 into its "timed bake" position, and sets the dial 154 of the oven thermostat 150 into the desired bake temperature. In its "timed bake" position, the selector switch 10 prepares a circuit for energizing only the bake heating unit RB across the line conductors L1 and L2; which circuit mentioned is initially closed and later opened by the main contacts 161 of the oven timer 160 at proper start and stop clock times as preset as a consequence of the setting of the knobs K1 and K2; and which circuit mentioned is selectively closed and opened by the oven thermostat 150 at the switch contacts 152 in order to hold the temperature in the oven 100 at that preset by the dial 154 in the manner previously described. The circuit for a "timed bake" operation is as follows: from the conductor L1 through the contact C22, the switch spring W2, the conductor 102 to one terminal of the bake heating unit RB; from the other terminal of the bake heating unit RB through the conductor 157, the switch contacts 152, the conductor 158, the switch spring W1, the contact C11, the conductor 165, and the switch contact 161 to the main line conductor L2.

In accordance with the present invention, the heating system can be set to carry out a "keep warm" operation at the conclusion of any "timed bake" operation so that the cook may not only terminate the cooking operation at a predetermined time but thereafter maintain the cooked food within the oven 100 at a predetermined warm temperature of, for example, 140° F. Alternatively, the cook may choose to keep the cooked food in a "keep hot" operation wherein the temperature of the cooked food is maintained, for example, at about 170° F.

Assuming that the cook wishes to cary out a "timed bake-keep warm" operation, the manual knob K1 is set to a desired time-to-stop position such as, for example, 6:00 p.m. if the clock time on the clock 160a is 3:00 p.m. The manual knob K2 is then set out of its "manual" position into one of its variable time interval positions such as 1½ hours to bake. When the knob K2 is set out of its "manual" position, the switch contacts on the oven timer 160 move from the normal position illustrated in FIG. 2 to the actuated position wherein the switch contacts 161 and 164 are open and the switch contacts 162 and 163 are closed. The cook then sets the selector switch 10 in the "timed bake-keep warm" position and selects the desired baking temperature on the oven thermostat 150 by turning the dial 154. At the completion of the above setting of the various controls, there will be no heating circuit energized. At 4:30 p.m., i.e., 1½ hours preceding 6:00 p.m. as set by the knob K2, the oven timer 160 operates to move the various contacts thereof to the normal position, whereby to close the contacts 161 and 164 and to open the contacts 162 and 163. A circuit is now completed for the bake heating unit RB as has been described above with respect to the "timed bake" operation. The "timed bake" operation continues in the normal manner with the usual circuits energized.

At the end of the "timed bake" operation with the selector switch 10 in the "timed bake-keep warm" position, i.e., at 6:00 p.m. as set by the control knob K1, a circuit is established by the movement on the switch contacts on the oven 160 to the operated position thereof, and more specifically by the opening of the switch contacts 161 and the closing of the switch contacts 162 to create a circuit from the line conductor L1 through the bake heating unit RB in series with the broil heating unit RT to the neutral conductor N. More particularly, a circuit is established from the line conductor L1 (see FIG. 2) through the closed switch contacts 162, the conductor 167, the contact C31, the switch spring W3, and the conductor 102 to one terminal of the bake heating unit RB; from the other terminal of the bake heating unit RB through the conductor 157, the closed switch contacts 152 and 151, and the conductor 156 to one terminal of the broil heating unit RT; from the other terminal of the broil heating unit RT through the conductor 101, the switch spring W5, the contact C52, the conductor 169, the closed contacts 163, the conductor 170, the switch spring W6 and the contact C61 to the conductor 111; during the positive-going half cycles of the power source through the diode D2, the conductor 112, the rectifier SCR, the conductor 116 and the diode D3 to the neutral conductor N; during the negative-going half cycles of the power source from the neutral conductor N through the diode D1, the conductor 112, the rectifier SCR, the conductor 116 and the diode D4 to the conductor 111.

It will be seen therefore that the heating units RB and RT are connected in series with each other and with the rectifier SCR between the line conductor L1 and the neutral conductor N, so that the current through the heating units RP and RT and consequently the heat therefrom is dependent upon the state of conduction of the rectifier SCR, the rectifier SCR going from its normal nonconductive state to a conductive state upon the application of a control signal to the control terminal 115 thereof. The current passed by the rectifier SCR depends upon the ratio between the time that it is in its nonconductive and conductive states, and more particularly, the portion of each power half cycle that it is conducting, so that the time delay between the application of the control signals to the control terminal 115 and the beginning of each corresponding power half cycle determines the current conducted by the rectifier SCR and therefore the current supplied to the heating units RB and RT. The time at which the control signal is supplied to the control terminal of the SCR is in turn controlled by the charging rate of the capacitor C1, a fast charging rate of the capacitor C1 rendering the rectifier SCR conductive early in each power half cycle, a slow charging rate of the capacitor C1 rendering the rectifier SCR conductive late in each power half cycle. The charging rate of the capacitor C1 is determined by the resistance in its charging path which is in turn selected by the selector switch 10. More specifically, the charging path for the capacitor C1 can be traced from the conductor 116 through the capacitor C1, the conductor 124, the switch spring W8, the contact C81, the conductor 127, and the resistor RW, and the conductor 117. The resistor RW is relatively large compared to the resistor RH and causes a relatively slow charging of the capacitor C1 so as to reach the firing potential for the unijunction transistor 120 relatively late in each power half cycle so as to fire the rectifier SCR relatively late in each power half cycle and thus to provide a relatively small warming power to the heating units RB and RT such as to maintain the interior of the oven 100 and its contents at about 140° F.

In order to carry out a "timed bake-keep hot" operation, the cook sets the dial 12 of the selector switch 10 to the "timed bake-keep hot" position thereof and sets the other dials and knobs K1, K2 and 154 as described above for the "timed bake-keep warm" operation. The "timed bake" cycle proceeds as in the normal "timed bake" operation and at the clock time-to-stop set by the knob K1 the switch contacts of the oven timer 160 are moved to the operated position thereof wherein the contacts 161 and 164 are opened and the contacts 162 and 163 are closed. In the "timed bake-keep hot" operation, a circuit is made from the line conductor L1 through the heating units RB and RT in series and through the rectifier SCR to the neutral conductor N, as has been explained above when describing the "timed bake-keep warm" operation. The control circuit for the rectifier SCR, however, is different, and more specifically, the charging circuit for the capacitor C1 is traced from the conductor 116 through the capacitor C1, the conductor 124, the switch spring W9, the contact C91, the conductor 128 and the resistor RH to the conductor 117. The resistor RH has a relatively small resistance compared to the resistance of the resistor RW so that the charging rate of the capacitor C1 is greater when the resistor RH is in circuit therewith as compared to the charging rate thereof when the resistor RW is in circuit therewith. Accordingly, the potential on the conductor 124 will more quickly reach the firing potential for the unijunction transistor 120 and the rectifier SCR will conduct earlier in each power half cycle. As a consequence more current is supplied to the heating units RB and RT and the heat generated thereby is consequently greater. The value of RH is selected so that the oven 100 is maintained at a temperature of about 170° F. at the conclusion of the "timed-bake" portion cycle, when the selector switch 10 is in the "timed bake-keep hot" position.

Assuming that the cook wishes to carry out a "warm thaw" operation, this is accomplished by the proper manipulation of the selector switch 10 and the oven timer 160. Assuming that it is 3:00 p.m. and the cook desires to have a thawing operation lasting for 15 minutes, the knob K1 is manually operated to set a time-to-stop of, for example, 6:00 p.m. The knob K2 is then moved out of its "manual" position and into an operative position corresponding to a time interval of two hours and forty-five minutes, i.e., a time interval equal to the difference between the time-to-stop clock time set by the knob K1 and the clock time as indicated by the clock 160a less the desired length of the thawing operation. When the knob K2 is set out of its "manual" position, the switch contacts on the oven timer 160 move from the normal position illustrated in FIG. 2 to the actuated position wherein the switch contacts 161 and 164 are open and the switch contacts 162 and 163 are closed. The cook then sets the selector switch 10 in the "thaw warm" position and sets the oven thermostat from the "off" position to some temperature above about 200° F.

As soon as the selector switch 10 has been placed into the "thaw warm" position and with the knobs K1 and K2 of the oven timer 160 set as described above, the following circuit is completed connecting the bake heat-unit RB and the broil heating unit RT in series with each other and across the line conductor L1 and the neutral conductor N. More specifically, a circuit is established from the line conductor L1 (see FIG. 1) through the contact 22, the switch spring W2 and the conductor 102 to one terminal of the bake heating unit RB; from the other terminal of the heating unit RB through the conductor 157, the closed switch contacts 152, the conductor 158, the closed switch contacts 151, and the conductor 156 to one terminal of the heating unit RT; from the other terminal of the heating unit RT through the conductor 101, the switch spring W5, the contact C52, the conductor 169, the closed switch contacts 163, the conductor 170, the switch spring W6 and the contact C61, to the conductor 111; during the positive-going half cycles of the power source through the diode D2, the conductor 112, the rectifier SCR, the conductor 116 and the diode D3 to the neutral conductor N; during the negative-going half cycles of the power source from the neutral conductor N through the diode D1, the conductor 112, the rectifier SCR, the conductor 116, and the diode D4 to the conductor 111.

It will be seen therefore that the heating units RB and RT are connected in series with each other and with the rectifier SCR between the line conductor L1 and the neutral conductor N, so that the current through the heating units RB and RT and consequently the heat therefrom is dependent upon the state of conduction of the rectifier SCR, the rectifier SCR going from its normal non-conductive state to a conductive state upon the application of a control signal to the control terminal 115 thereof. The current passed by the rectifier SCR depends upon the ratio between the time that it is in its non-conductive and conductive states, and more particularly, the portion of each power half cycle that it is conducting, so that the time delay between the application of the control signals to the control terminal 115 and the beginning of each corresponding power half cycle determines the current conducted by the rectifier SCR and therefore the current supplied to the heating units RB and RT. The time at which the control signal is supplied to the control terminal of the SCR is in turn controlled by the charging rate of the capacitor C1, a fast charging rate of the capacitor C1 renedering the rectifier SCR conductive early in each power half cycle, a slow charging rate of the capacitor C1 rendering the rectifier SCR conductive late in each power half cycle. The charging rate of the capacitor C1 is determined by the resistance in its charging path which is in turn selected by the position of the selector switch 10. More specifically, the charging path for the capacitor C1 when the selector switch 10 is in the "thaw warm" position can be traced from the conductor 116 through the capacitor C1, the conductor 124, the switch spring W8, the contact C82 and the conductor 127 to one terminal of the resistor RW, and from the other terminal of the resistor RW to the conductor 117. The resistor RW is relatively large and causes a relatively slow charging of the capacitor C1 so as to reach the firing potential for the unijunction transistor 120 relatively late in each power half cycle so as to fire the rectifier SCR relatively late in each power half cycle, and thus to provide a relatively small thawing current to the heating units RB and RT, such as to maintain the interior of the oven 100 at about 140° F.

At 3:15 p.m., i.e., after the expiration of the desired fifteen minutes of thawing and at the two hour and forty-five minute clock time set by the knob K2 before the time-to-stop clock time set by the knob K1, the oven timer 160 is actuated to the normal position thereof illustrated in FIG. 2 which serves to open the switch contacts 163 thus interrupting the path for current flow to the heating units RB and RT so as to terminate the "thaw warm" operation. Despite the fact that the main power contacts 161 are closed, there is no circuit for applying heating current to the heating units RB and RT and consequently there is no further heating of the oven 100. The cook may remove the thawed food from the over 100 at any time prior to 6:00 p.m., i.e., the time-to-stop clock time as set by the knob K1. More specifically, all of the circuits are disconnected if the cook will turn the knob K2 to the "manual" position thereof; it is, of course, preferred that the cook also return the selector switch 10 to its "off" position. It is to be understood that "thaw warm" operations of shorter or longer duration can be obtained by setting the knob K2 for longer and shorter times respectively so as to cause actuation of the oven timer 160 and its switch contacts to the normal position thereof opening the switch contacts 163 either earlier or later respectively.

In order to carry out a "thaw hot" operation, the cook sets the dial 12 of the selector switch 10 to the "thaw hot" position thereof and sets the other dials and knobs K1, K2 and 154 as described above for the "thaw warm" operation. With the various controls thus adjusted, a circuit is completed from the line conductor L1 through the heating units RB and RT in series and through the rectifier SCR to the neutral conductor N, as has been explained above when describing the "thaw warm" operation. The control circuit for the rectifier SCR, however, is different, and more specifically, the charging circuit for the capacitor C1 is traced from the conductor 116 through the capacitor C1, the conductor 124, the switch spring W9, the contact C92, the conductor 128, and the resistor RH to the conductor 117. The resistor RH has a relatively small resistance compared to the resistance of the resistor RW so that the charging rate of the capacitor C1 is greater when the resistor RH is in circuit therewith as compared with the charging rate thereof when the resistor RW is in circuit therewith. Accordingly, the potential on the conductor 124 will more quickly reach the firing potential for the unijunction transistor 120 and the rectifier SCR will conduct earlier in each power half cycle. As a consequence, more current is supplied to the heating units RB and RT and the heat generated thereby is consequently greater. The value of RH is selected so that the oven 100 is maintained at a temperature of about 170° F. during the "thaw-hot" operation.

At the end of the "thaw hot" operation, i.e., at 3:15 p.m. in the illustrated example, the oven timer 160 is actuated into the normal position illustrated in FIG. 2 of the drawings so as to open the switch contacts 163 and thus to interrupt the flow of current to the heating units RB and RT so as to terminate the "thaw hot" operation. The cook now may remove the thawed food from the oven 100 at any time before the clock time set by the knob K1, i.e., at any time before 6:00 p.m. in the illustrative example. Upon removing the thawed food from the oven 100, the cook will also return the knob K2 to its "manual" position, return the selector switch 10 to its "off" position and return the oven thermostat 150 to its "thaw" position. It is to be understood that "thaw hot" operations of shorter or longer duration can be obtained by setting the knob K2 for longer and shorter times respectively so as to cause actuation of the oven timer and its switch contacts to the normal position thereof opening the switch contacts 163 either earlier or later respectively.

In view of the foregoinng, it is apparent that there has been provided an improved household cooking oven of the type having a selector switch and an oven thermostat and an oven timer and circuits associated therewith, all cooperating to provide the usual "bake" operation and "broil" operation and "timed bake" operation, wherein the system also provides a warming heat within the oven at the end of the "timed bake" operation, two values of warming heat being available, and wherein a system is provided to produce a thawing heat in the oven by the proper setting of the selector switch and the oven thermostat and the oven timer, two distinct thawing temperatures being provided and operable for a preselected time duration in accordance with the setting of the oven timer.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, structure defining a baking oven, an electric heating unit operatively associated with said oven, a source of electric power, a manually settable oven thermostat operatively associated with said oven and having a variable temperature control position, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the set time interval, a manually settable oven selector having a "timed bake" position and a "timed bake and keep warm" position, a power control apparatus adapted to effect the supply of low power therethrough, means governed jointly by said oven thermostat in its set temperature control position and by said oven timer in its first control position and by said oven selector in either one of its positions named for connecting said heating unit independently of said power control apparatus to said power source in order to effect the supply of high power to said heating unit for the bake purpose, and means governed jointly by said oven thermostat in its set temperature control position and by said oven timer in its second control position and by said oven selector in its "timed bake and keep warm" position for connecting said heating unit in series relation with said power control apparatus to said power source in order to effect the supply of low power to said heating unit for the keep warm purpose.

2. In combination, structure defining a baking oven, an electric heating unit operatively associated with said oven, a source of electric power, a manually settable oven thermostat operatively associated with said oven and having a variable temperature control position, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the set time interval, a manually settable oven selector having a "timed bake" position and a "timed bake and keep warm" position and a "timed bake and keep hot" position, a power control apparatus adapted to effect the supply of low power therethrough, means governed jointly by said oven thermostat in its set temperature control position and by said oven timer in its first control position and by said oven selector in any one of its three positions named for connecting said heating unit independently of said power control apparatus to said power source in order to effect the supply of high power to said heating unit for the bake purpose, means governed by said oven selector in its "timed bake and keep warm" position for setting said power control apparatus to supply first low power therethrough and governed by said oven selector in its "timed bake and keep hot" position for setting said power control apparatus to supply second low power therethrough, wherein said second low power is somewhat higher than said first low power, and means governed jointly by said oven thermostat in its set temperature control position and by said oven timer in its second control position and by said oven selector in either its "timed bake and keep warm" position or its "timed bake and keep hot" position for connecting said heating unit in series relation with said power control apparatus to said power source in order to effect the supply of corresponding first or second low power to said heating unit for the corresponding keep warm or keep hot purpose.

3. In combination, structure defining a baking oven, an electric heating unit operatively associated with said oven, a source of electric power, a manually settable oven thermostat operatively associated with said oven and having a variable temperature control position, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the set time interval, a manually settable oven selector having an "off" position and a "timed bake" position and a "timed bake and keep warm" position, a power control apparatus adapted to effect the supply of low power therethrough, means responsive to setting of said oven selector into its "off" position for disconnecting said heating unit from said power source, means governed jointly by said oven thermostat in its set temperature control position and by said oven timer in its first control position and by said oven selector in either its "timed bake" position or in its "timed bake and keep warm" position for connecting said heating unit independently of said power control apparatus to said power source in order to effect the supply of high power to said heating unit for the bake purpose, and means governed jointly by said oven thermostat in its set temperature control position and by said oven timer in its second control position and by said oven selector in its "timed bake and keep warm" position for connecting said heating unit in series relation with said power control apparatus to said power source in order to effect the supply of low power to said heating unit for the keep warm purpose.

4. In combination, structure defining a baking oven, an electric heating unit operatively associated with said oven, a source of electric power, a manually settable oven thermostat operatively associated with said oven and having a variable temperature control position, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the set time interval, a manually settable oven selector having a "timed bake" position and a "timed warm thaw" position, a power control apparatus adapted to effect the supply of low power therethrough, means governed jointly by said oven thermostat in its set temperature control position and by said oven timer in its first control position and by said oven selector in its "timed bake" position for connecting said heating unit independently of said power control apparatus to said power source in order to effect the supply of high power to said heating unit for the bake purpose, and means governed jointly by said oven thermostat in its set temperature control position and by said oven timer in its second control position and by said oven selector in its "timed warm thaw" position for connecting said heating unit in series relation with said power control apparatus to said power source in order to effect the supply of low power to said heating unit for the warm thaw purpose.

5. In combination, structure defining a baking oven, an electric heating unit operatively associated with said oven, a source of electric power, a manually settable oven thermostat operatively associated with said oven and having a variable temperature control position, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the set time interval, a manually settable oven selector having a "timed bake" position and a "timed warm thaw" position and a "timed hot thaw" position, a power control apparatus adapted to effect the supply of low power therethrough, means governed jointly by said oven thermostat in its set temperature control position and by said oven timer in its first control position and by said oven selector in its "timed bake" position for connecting said heating unit independently of said power control apparatus to said power source in order to effect the supply of high power to said heating unit for the bake purpose, means governed by said oven selector in its "timed warm thaw" position for setting said power control apparatus to supply first low power therethrough and governed by said oven selector in its "timed hot thaw" position for setting said power control apparatus to supply second low power therethrough, wherein said second low power is somewhat higher than said first low power, and means governed jointly by said oven thermostat in its set temperature control position and by said oven timer in its second control position and by said oven selector in either its "timed warm thaw" position or its "timed hot thaw" position for connecting said heating unit in series relation with said power control apparatus to said power source in order to effect the supply of corresponding first or second low power to said heating unit for the corresponding warm thaw or hot thaw purpose.

6. In an electric oven, combination, structure defining a baking heating unit operatively associated with said oven, a source of electric power, a manually settable oven thermostat operatively associated with said oven and having a variable temperature control position, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the set time interval, a manually settable oven selector having a "timed bake" position and a "timed bake and keep warm" position and a "timed warm thaw" position, a power control apparatus adapted to effect the supply of low power therethrough, means governed jointly by said oven thermostat in its set temperature control position and by said oven timer in its first control position and by said oven selector in either its "timed bake" position or in its "timed bake and keep warm" position for connecting said heating unit independently of said power control apparatus to said power source in order to effect the supply of high power to said heating unit for the bake purpose, and means governed jointly by said oven thermostat in its set temperature control position and by said oven timer in its second control position and by said oven selector in its "timed bake and keep warm" position for connecting said heating unit in series relation with said power control apparatus to said power source in order to effect the supply of low power to said heating unit for the keep warm purpose, and means governed jointly by said oven thermostat in its set temperature control position and by said oven timer in its second control position and by said oven selection in its "timed warm thaw" position for connecting said heating unit in series relation with said power control apparatus to said power source in order to effect the supply of low power to said heating unit for the warm thaw purpose.

References Cited by the Examiner
UNITED STATES PATENTS

| | | | |
|---|---|---|---|
| 2,150,634 | 3/1939 | Rhodes | 200—39 |
| 2,654,824 | 10/1953 | Schroeder | 219—398 |
| 2,914,644 | 11/1959 | Holtkamp | 219—413 |
| 3,032,636 | 5/1962 | Schauer | 219—412 |

RICHARD M. WOOD, *Primary Examiner.*

ANTHONY BARTIS, *Examiner.*

UNITED STATES PATENT OFFICE
CERTIFICATE OF CORRECTION

Patent No. 3,221,142                            November 30, 1965

Harris P. Kamide

It is hereby certified that error appears in the above numbered patent requiring correction and that the said Letters Patent should read as corrected below.

Column 14, line 16, for "selection" read -- selector --.

Signed and sealed this 7th day of February 1967.

(SEAL)
Attest:

ERNEST W. SWIDER
Attesting Officer

EDWARD J. BRENNER
Commissioner of Patents